United States Patent
Uchikoshi et al.

(10) Patent No.: US 9,971,326 B2
(45) Date of Patent: May 15, 2018

(54) SEQUENCER SYSTEM AND ADDRESS SETTING METHOD

(71) Applicants: Masahiro Uchikoshi, Tokyo (JP); Koichi Shinkai, Tokyo (JP)

(72) Inventors: Masahiro Uchikoshi, Tokyo (JP); Koichi Shinkai, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 227 days.

(21) Appl. No.: 14/758,816

(22) PCT Filed: Mar. 29, 2013

(86) PCT No.: PCT/JP2013/059616
§ 371 (c)(1),
(2) Date: Jul. 1, 2015

(87) PCT Pub. No.: WO2014/155701
PCT Pub. Date: Oct. 2, 2014

(65) Prior Publication Data
US 2015/0355617 A1 Dec. 10, 2015

(51) Int. Cl.
*G05B 19/042* (2006.01)
*H04L 12/733* (2013.01)
(52) U.S. Cl.
CPC .......... *G05B 19/042* (2013.01); *H04L 45/20* (2013.01); *G05B 2219/2207* (2013.01)
(58) Field of Classification Search
CPC .......... G05B 19/042; G05B 2219/2207; H04L 45/20
See application file for complete search history.

(56) References Cited

U.S. PATENT DOCUMENTS 5,309,433 A   5/1994  Cidon et al.
6,157,644 A * 12/2000  Bernstein ............... H04L 45/00
                                                          370/389

(Continued)

FOREIGN PATENT DOCUMENTS

JP   04-181401 A   6/1992
JP   07-028393 A   1/1995

(Continued)

OTHER PUBLICATIONS

International Search Report for PCT/JP2013/059616 dated Apr. 23, 2013.

(Continued)

*Primary Examiner* — Charles Kasenge
(74) *Attorney, Agent, or Firm* — Sughrue Mion, PLLC; Richard C. Turner

(57) ABSTRACT

To provide a sequencer system including a plurality of bases. The plurality of bases are configured by a fundamental base and a plurality of stages of extension bases, the fundamental base being installed with a control unit. The control unit is configured to enable transmission of a HOP designation packet toward the bases, number of HOPs being designated for the HOP designation packet. Upon reception of the HOP designation packet with the number of HOPs being other than 0, each of the bases subtracts the number of HOPs by one, and transfers the HOP designation packet to the base connected to a subsequent stage. Upon reception of the HOP designation packet with the number of HOPs being 0, each of the bases determines that the HOP designation packet is a packet directed to the base itself.

2 Claims, 6 Drawing Sheets

(56) References Cited

U.S. PATENT DOCUMENTS

| | | | | |
|---|---|---|---|---|
| 7,263,061 B2* | 8/2007 | Yamada | H04L 45/00 | 370/217 |
| 7,447,796 B2* | 11/2008 | Forrester | H04L 45/00 | 370/351 |
| 7,596,808 B1* | 9/2009 | Wilkinson | H04L 63/0272 | 709/223 |
| 7,747,776 B2* | 6/2010 | Forrester | H04L 45/00 | 370/351 |
| 8,176,154 B2* | 5/2012 | Minhazuddin | H04L 29/06 | 709/223 |
| 8,565,104 B2* | 10/2013 | Miyata | G05B 19/042 | 370/236 |
| 9,391,716 B2* | 7/2016 | Shin | H04B 10/803 | |
| 2003/0117966 A1* | 6/2003 | Chen | H04L 45/02 | 370/255 |
| 2006/0092162 A1* | 5/2006 | Deering | G06T 15/005 | 345/506 |
| 2006/0137002 A1* | 6/2006 | Forrester | H04L 45/00 | 726/11 |
| 2008/0288656 A1* | 11/2008 | Forrester | H04L 45/00 | 709/238 |
| 2009/0105850 A1* | 4/2009 | Miyata | G05B 19/042 | 700/28 |
| 2009/0279426 A1* | 11/2009 | Mangal | H04L 12/66 | 370/218 |
| 2011/0243074 A1* | 10/2011 | Shin | H04B 10/803 | 370/329 |

FOREIGN PATENT DOCUMENTS

| | | |
|---|---|---|
| JP | 07-181885 A | 7/1995 |
| JP | 08-030306 A | 2/1996 |
| JP | 2002-258907 A | 9/2002 |
| JP | 2006-033334 A | 2/2006 |
| JP | 2008-097523 A | 4/2008 |
| JP | 2008-269013 A | 11/2008 |

OTHER PUBLICATIONS

Communication dated Oct. 12, 2016, from the Korean Intellectual Property Office, in counterpart Korean application No. 10-2015-7025797.

Communication dated Oct. 9, 2017 from the German Patent and Trademark Office in counterpart application No. 11 2013 006 760.9.

* cited by examiner

SEQUENCER SYSTEM AND ADDRESS SETTING METHOD

CROSS REFERENCE TO RELATED APPLICATIONS

This application is a National Stage of International Application No. PCT/JP2013/059616, filed Mar. 29, 2013, the contents of all of which are incorporated herein by reference in their entirety.

FIELD

The present invention relates to a sequencer system and an address setting method.

BACKGROUND

A multistage sequencer system where a plurality of bases are connected has been conventionally used as described, for example, in Patent Literature 1. Each of the bases is installed with a plurality of sequencer units. As an address setting method for each of the bases, for example, the following method may be employed in such a sequencer system.

For example, as an example in which a fundamental base and multistage extension bases are connected in a bus configuration by composite signal lines, there is a way of short-circuiting an address setting signal for performing address setting for each of the extension bases by a jumper line so as to read the signal by using a logic circuit.

Further, as an example in which address setting is fixed, there is a way of providing an adder circuit in each of bases and using an addressing signal. For example, a base address for the fundamental base is generated by the fundamental base and the base address is electronically transferred to each of extension bases by using the addressing signal. In each of the extension bases, the base address is incremented by one by the adder circuit, and thus a base address for each of the extension bases is generated.

Furthermore, as an example in which address setting is automated, there is a way of using an address fixing signal. For example, a control unit installed in a fundamental base transmits an address via a composite signal line and outputs an address fixing signal. In a state that an address is unset, a logic circuit receives an address and an address fixing signal so as to self-configure contents of the address and transmit a response to the control unit via the composite signal line. Further, after address setting is complete, the logic circuit outputs an address-fixing transfer signal to a gate. The gate having received the address-fixing transfer signal enters a state in which the address fixing signal can be electronically transferred to an extension base connected to the subsequent stage. By repeating this operation also in the extension base of the subsequent stage, address setting in the bases is automated.

CITATION LIST

Patent Literature

Patent Literature 1: Japanese Patent Application Laid-open No. 2002-258907

SUMMARY

Technical Problem

However, in such an address setting method as described above in which an address setting signal is short-circuited by the jumper line, the workload of a user increases at the time of starting up the system or changing the system configuration. Further, from the viewpoint of focusing on system scalability in recent years, it has been desired to realize labor-saving of these tasks. In addition, because incomplete address setting and incorrect address setting are likely to occur due to a heavy workload at the time of system startup or system configuration change, automation of the work is desired.

Furthermore, in the method of fixing an address setting as described above, an addressing signal is additionally required. Further, the address is sequentially incremented by one in an extension base, and thus the address is allocated sequentially from an upper stage. Therefore, an arbitrary address cannot be allocated to a specific stage. In addition, if a base is added to an intermediate stage, all addresses for the subsequent stages are changed, and thus a user also needs to change the addresses used in a program.

According to the above method in which address setting is automated, an address fixing signal is additionally required. After address setting is completed, the address fixing signal is electronically transferred to an extension base connected to a subsequent stage, so it is required to set the addresses sequentially from an upper stage. Further, after all the addresses have been set, the address fixing signal is electronically transferred to the base of the final stage. In this case, each of the extension bases is in a state of ignoring the address fixing signal, it is required to cancel all the addresses and set addresses again from the upper stage, in order to change the address for an arbitrary stage. Therefore, during resetting the addresses, the control unit cannot access all of other controlled units, and thus it is required to stop control of the sequencer system.

An object of the present invention is to provide a sequencer system that automates address setting for a base and enables flexible implementation of setting order and setting change in the address setting so as to improve system scalability.

Solution to Problem

According to one aspect of the present invention in order to solve the problems and the object descried above, there is provided a sequencer system comprising a plurality of bases, wherein the plurality of bases include a fundamental base and a plurality of stages of extension bases, the fundamental base being installed with a control unit, the fundamental base and the plurality of stages of extension bases are serially connected by a bus using composite signal lines, the fundamental base being one end of the serial connection, communication with one of the bases different from another of bases adjacent to the one is enabled by electronic transfer between the bases in a relay form, the control unit is constructed so as to be capable of transmitting a HOP designation packet toward the bases, number of HOPs being designated for the HOP designation packet, and upon reception of the HOP designation packet with the number of HOPs being other than 0, each of the bases subtracts the number of HOPs by one, and transfers the HOP designation packet to the base connected to a subsequent stage, and, upon reception of the HOP designation packet with the number of HOPs being 0, each of the bases determines that the HOP designation packet is a packet directed to the base itself.

Advantageous Effects of Invention

The sequencer system according to the present invention can achieve a sequencer system that automates address setting for a base and enables flexible implementation of setting order and setting change in the address setting so as to improve system scalability.

DESCRIPTION OF EMBODIMENTS

Exemplary embodiments of a sequencer system and an address setting method according to the present invention will be described below in detail with reference to the accompanying drawings. The present invention is not limited to the embodiments.

First Embodiment

Figure 1:
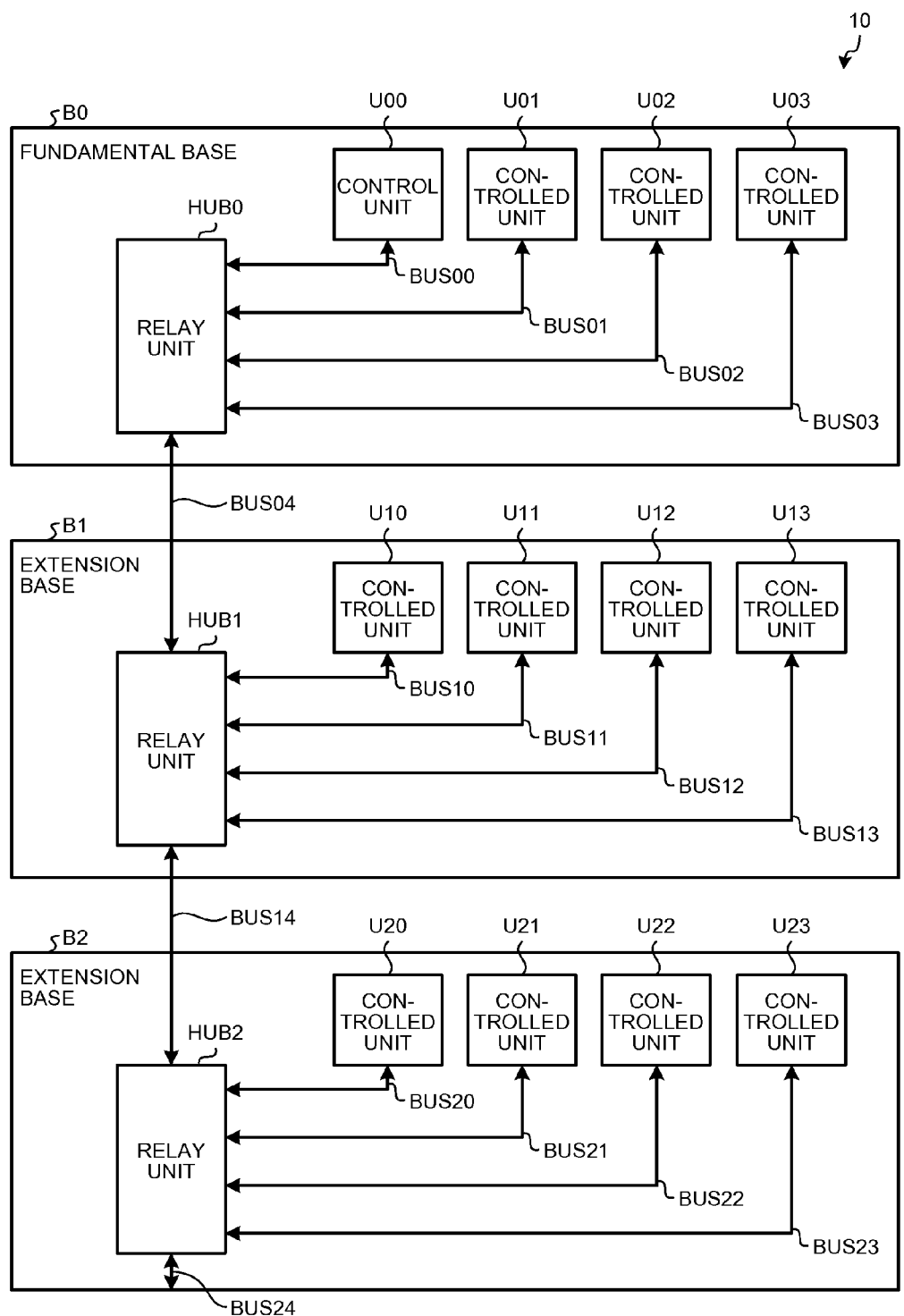
FIG. 1 is a block diagram illustrating a schematic configuration of a sequencer system according to a first embodiment of the present invention.

FIG. 1 is a block diagram illustrating a schematic configuration of a sequencer system according to a first embodiment of the present invention. A sequencer system 10 is a multistage sequencer system having three-stage bases configured by a fundamental base B0 and two extension bases B1 and B2. The fundamental base B0 is installed with a control unit U00 and controlled units U01 to U03, as sequencer units. The fundamental base B0 has a relay unit HUB0.

The extension base B1 is installed with controlled units U10 to U13 as sequencer units. The extension base B2 is installed with controlled units U20 to U23 as sequencer units. The extension base B1 has a relay unit HUB1, and the extension base B2 has a relay unit HUB2.

In the configuration described above, it is assumed that the fundamental base B0 is installed with one control unit and three controlled units. It is noted, however, that the number of control units and controlled units is not limited thereto. For example, two or more control units may be installed, and four or more controlled units may be installed. It is a matter of course that two or less controlled units may be installed.

In the configuration described above, each of the extension bases B1 and B2 is installed with four controlled units. However, the number of controlled units is not limited to four, and an arbitrary number of controlled units may be installed. Further, in the configuration described above, the sequencer system is a three-stage sequencer system 10 configured by the fundamental base B0 and the extension bases B1 and B2. However, the number of extension bases is not limited to two and this number is arbitrary. For example, three or more extension bases may be provided.

In the sequencer system 10, the respective bases B0 to B2 are connected in a line configuration by the relay units HUB0 to HUB2. Specifically, the relay unit HUB0 installed in the fundamental base B0 and the relay unit HUB1 installed in the extension base B1 are connected to each other by a composite signal line BUS04. Further, the relay unit HUB1 installed in the extension base B1 and the relay unit HUB2 installed in the extension base B2 are connected to each other by a composite signal line BUS14.

In this way, the fundamental base B0 and a plurality of stages of the extension bases B1 to B2 are serially connected, with the fundamental base B0 being one end of the serial connection, by using the composite signal lines BUS04 to BUS24. In a case that an additional extension base is provided, the composite signal line BUS24 for connecting to a relay unit of the additional extension base of the subsequent stage is pulled out from the relay unit HUB2 installed in the extension base B2.

In the fundamental base B0, the control unit U00, the controlled units U01 to U03, and the relay unit HUB0 are connected in a star configuration whose center is on the relay unit HUB0. More specifically, the control unit U00 and the controlled units U01 to U03 in the fundamental base B0 are connected to the relay unit HUB0 by composite signal lines BUS00 to BUS03.

In the extension base B1, the controlled units U10 to U13 and the relay unit HUB1 are connected in a star configuration whose center is on the relay unit HUB1. More specifically, the controlled units U10 to U13 are connected to the relay unit HUB1 by composite signal lines BUS10 to BUS13.

In the extension base B2, the controlled units U20 to U23 and the relay unit HUB2 are connected in a star configuration whose center is on the relay unit HUB2. More specifically, the controlled units U20 to U23 are connected to the relay unit HUB2 by composite signal lines BUS20 to BUS23.

Each of the composite signal lines BUS00 to BUS24 provides an independent connection. For example, a signal transmitted by the relay unit HUB0 to the relay unit HUB1 can be received only by the relay unit HUB1, and the signal cannot be received by the relay unit HUB2, the control unit U00, and the controlled units U01 to U23.

In this connection mode, communications between the control unit U00 and the controlled units U01 to U23 are performed according to a communication method of electronically transferring a packet to which a unit address is added as a destination address. The unit address is configured to include a base address and a slot number.

Transmission and reception of the packet in the sequencer system 10 are described here in a state that setting of a base address has been completed for each base. An example is now described where the control unit U00 reads data from the controlled unit U13 in a case that a unit address of the control unit U00 has been set to 00 and a unit address of the controlled unit U13 has been set to 13. The packet is configured to include a header and data. The control unit U00 stores the unit address 13 of the controlled unit U13 in a header portion of the packet and a read command in a data portion of the packet. The control unit U00 transmits the packet to the relay unit HUB0. The unit address "13" is configured to include a base address "1" and a slot number "3".

Then, the relay unit HUB0 transfers a read command packet to the relay unit HUB1 according to the destination address. Based on the information of the base address "1" included in the unit address "13", the relay unit HUB1 determines whether the packet is directed to its own base. In accordance with the information of the slot number "3" of the unit address "13", the relay unit HUB1 transfers the read command packet to the controlled unit U13 which is the third slot.

The controlled unit U13 having received the read command packet transmits a response packet to the relay unit HUB1. In the response packet, the unit address 00 of the control unit U00 is added as the destination address. In accordance with the destination address, the relay unit HUB1 transfers the response packet to the relay unit HUB0. In accordance with the destination address, the relay unit HUB0 transfers the response packet to the control unit U00 which is the 0th slot.

Next, setting of a base address is described here from a state where the base address is unset for each base. In the sequencer system 10 where the base address is unset for each base, a HOP designation packet in which the number of HOPs is designated is utilized for detecting connection of respective bases and setting the base address by using the control unit U00. Here, the HOP designation packet is defined as a packet in which the number of HOPs as the number of transfers of data is stored in the header portion.

Figure 2:
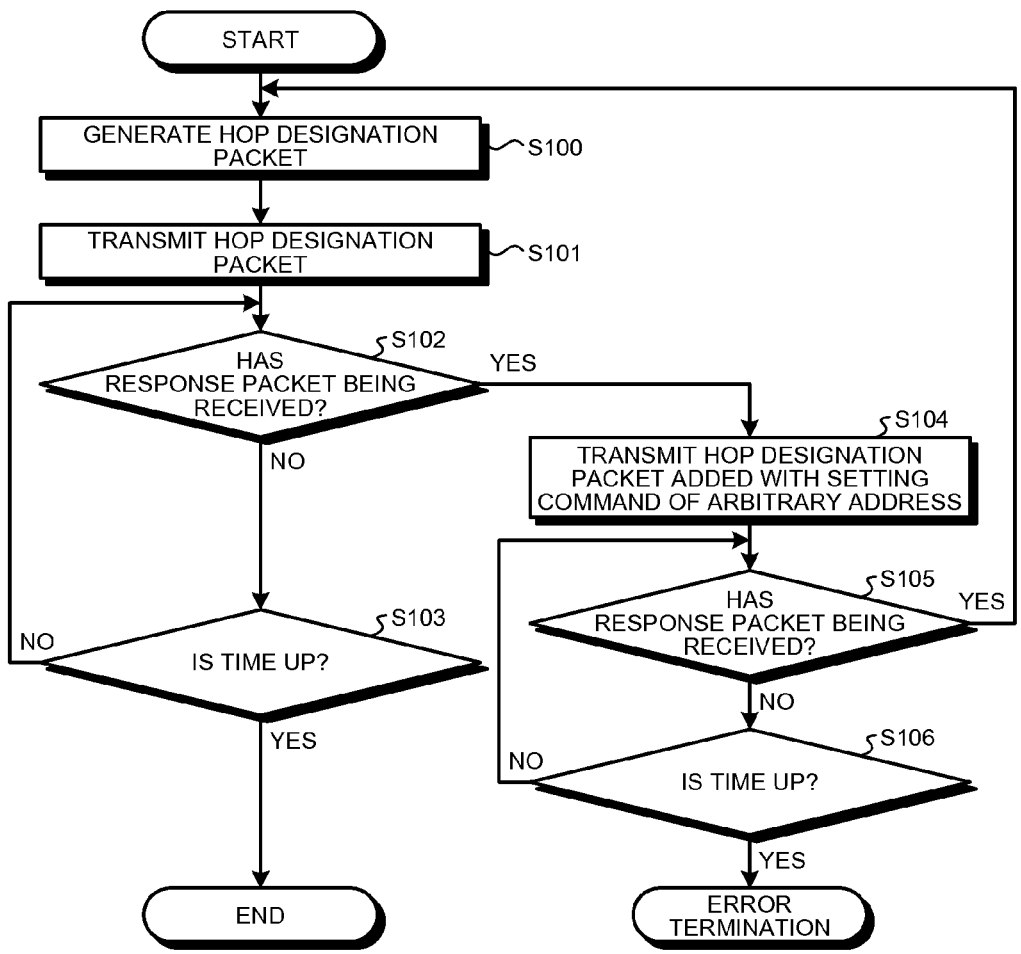
FIG. 2 is a flowchart describing an operation procedure of a control unit when detecting connection of a base and setting a base address.

FIG. 2 is a flowchart describing an operation procedure of the control unit U00 when detecting connection of a base and setting a base address. First, the control unit U00 generates a HOP designation packet (Step S100). For example, the control unit U00 generates a HOP designation packet in which the number of HOPs is designated as 1 for the extension base B1 of the first stage.

The control unit U00 then transmits the HOP designation packet to the relay unit HUB0 (Step S101). If the response packet cannot be received in response to the HOP designation packet transmitted at Step S101 (NO at Step S101), and the response packet cannot be received within a preset time, thus entering a time up state (YES at Step S103), then the flow ends. In this case, the control unit U00 determines that the extension base B1 corresponding to the number of HOPs=1, that is, the first stage of the extension bases has not been connected.

Meanwhile, before entering the time up state (NO at Step S103), then the process returns to Step S102. If Step S102 and Step S103 are repeated and the response packet is received before the time up state (YES at Step S102), then the control unit U00 determines that the extension base B1 corresponding to the number of HOPs=1, that is, the first stage of the extension bases has been connected, and transmits a HOP designation packet, to which an address setting command is added, to the extension base (Step S104). For example, the control unit U00 transmits a HOP designation packet to which the address setting command for the extension base B1 is added.

If the response packet cannot be received in response to the transmission packet transmitted at Step S104 (NO at Step S105), and the response packet cannot be received within the preset time, thus entering a time up state (YES at Step S106), it indicates that there is no response from the extension base whose connection has been confirmed at Step S102. Therefore, the control unit U00 determines that there is an error as ascribed to breakdown of the relay unit or disconnection of the composite signal line, and the flow ends.

Conversely, before entering the time up state (NO at Step S106), then the process returns to Step S10. If Step S105 and Step S106 are repeated and thus the response packet can be received before the time up state (YES at Step S105), then the control unit U00 determines that address setting for the extension base is complete. Thereafter, the control unit U00 returns to Step S100 so as to perform confirmation of connection and address setting for the subsequent stage of the extension bases. The flow is repeated until it is determined that the extension base corresponding to the number of HOPs has not been connected (YES at Step S103).

For example, according to the configuration of the sequencer system 10 illustrated in FIG. 1, it is determined at Step S105 that address setting for the extension base B1 is complete. Thereafter, the flow (Step S100 to Step S105) is performed again for the extension base B2, passing from generation of the HOP designation packet in which the number of HOPs corresponding to the extension base B2 is set to 2 up to address setting.

Subsequently, after it is determined at Step S105 that address setting for the extension base B2 is complete, a HOP designation packet in which the number of HOPs corresponding to the subsequent stage of the extension bases is set to 3 is generated at Step S100. Since a third stage of the extension bases, which is a subsequent stage of the extension base B2, is not connected here, the process enter a time up state at Step S103, and this flow ends. In this manner, after setting of the base address is complete, transmission and reception of a packet can be performed by using a unit address configured to include a base address and a slot number.

In the flow described above, the number of HOPs of the HOP designation packet generated at Step S100 is designated in ascending order with an initial value being set to 1, which indicates the first stage of the extension bases. However, the number of HOPs can be designated in descending order with an initial value being set to a preset maximum number of connections of the extension bases. Further, an arbitrary value can be designated in an arbitrary order. This means that address setting for the extension bases is not performed in the order of their connections, but address setting may be performed limitedly for arbitrary ones of extension bases.

Figure 3:
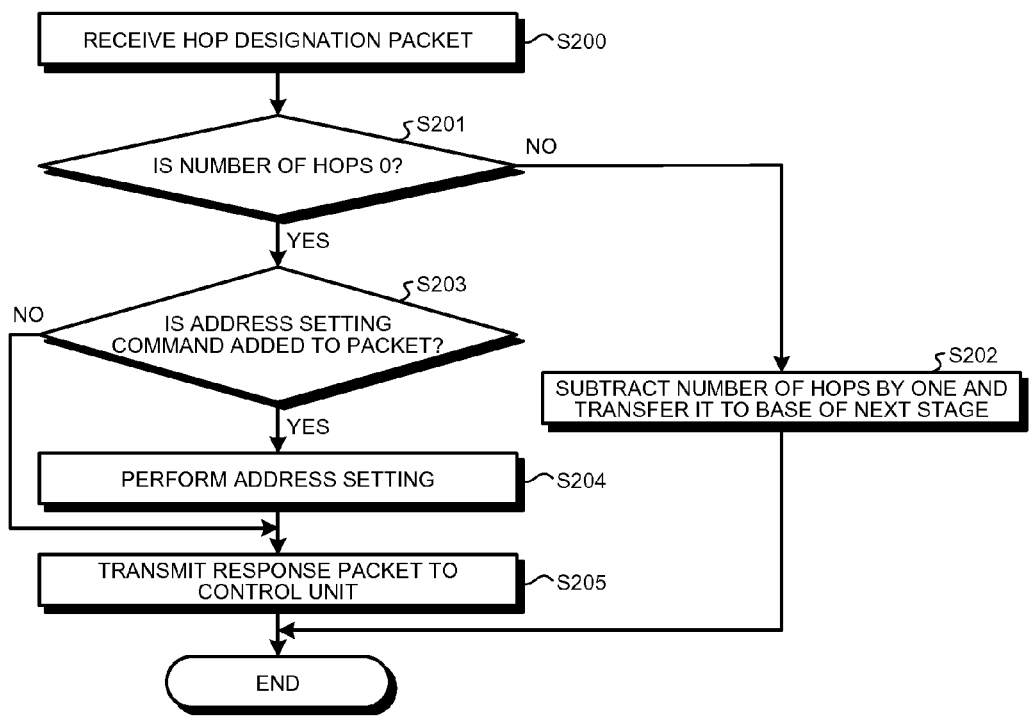
FIG. 3 is a flowchart describing an operation procedure of relay units.

Next, an operation of the relay units HUB0 to HUB2 included in the bases B0 to B2 with respect to the operation flow of the control unit U00 described above is now described. FIG. 3 is a flowchart describing an operation procedure of the relay units HUB0 to HUB2.

Upon reception of a HOP designation packet (Step S200), the relay unit determines whether the number of HOPs of the received HOP designation packet is 0 (Step S201). Thereafter, if the number of HOPs of the received HOP designation packet is not 0 (NO at Step S201), then the relay unit subtracts one from the number of HOPs and transfers the HOP designation packet to the relay unit in the base connected to the subsequent stage (Step S202), and the flow ends.

If the number of HOPs of the received HOP designation packet is 0 (YES at Step S201), then the relay unit determines whether an address setting command is added to the HOP designation packet (Step S203). In this case, if the address setting command is added to the HOP designation packet (YES at Step S203), then the relay unit self-configures a base address in accordance with the address setting command (Step S204), and it transmits a response packet to the control unit U00 (Step S205), and the flow ends.

Meanwhile, if the address setting command is not added to the HOP designation packet (NO at Step S203), then the relay unit proceeds to Step S205 so as to transmit a response packet to the control unit U00, and the flow finishes.

When the base address is changed for an arbitrary base in a state with address setting has been complete for the bases, a HOP designation packet is generated with the number of HOPs corresponding to the number of stage of the arbitrary base, and the base address can be set according to the flow in FIG. 2. At this time, because the relay unit only transfers the packet, the state that the base addresses have been set is maintained for the other bases. Therefore, even when an address is changed for one of the bases, there is little effect on the other bases. Accordingly, it is possible to change an address for one of the bases even during execution of control of other bases.

In a case that base addresses have been set and an additional extension base is provided, a HOP designation packet is generated with the number of HOPs added by one to the number of stages whose connections have been confirmed at that point. The base address can be set for the additional extension base according to the flow in FIG. 2. Even at this time, other bases are in a state that the base addresses have been set, and they are not affected by the addition of the base address. Accordingly, even during execution of control of other bases, it is possible to add a base address.

Figure 4:
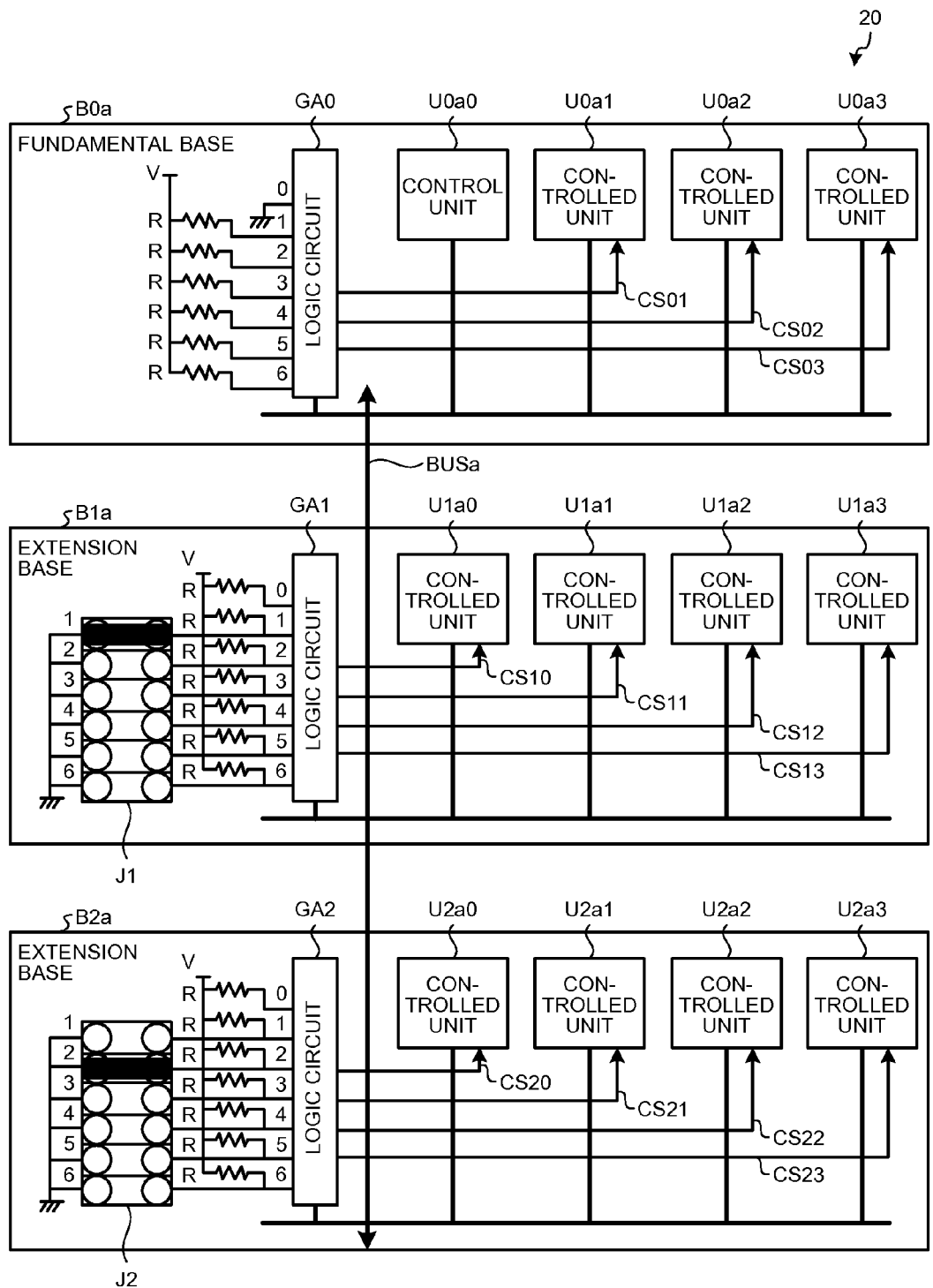
FIG. 4 is a block diagram illustrating a schematic configuration of a sequencer system represented as a first comparative example.

Next, sequencer systems are described as some comparative examples. FIG. 4 is a block diagram illustrating a schematic configuration of a sequencer system represented as a first comparative example. In a sequencer system 20 represented as the first comparative example, a fundamental base B0$a$ and a plurality of stages of extension bases B1$a$ and B2$a$ are connected in a bus configuration via a composite signal line BUSa.

A control unit U0$a$0 designates an address including a base number and a number of slots to which each unit is connected and controls controlled units. For example, such control is executed that if a signal is input to a controlled unit U1$a$3 connected to the extension base B1$a$, then a signal of a controlled unit U2$a$2 connected to the extension base B2$a$ is output. In this case, the control unit U0$a$0 sends a data read command to the third slot of the first stage of the bases so as to acquire input data and perform an operation according to a program. Thereafter, the control unit U0$a$0 sends a data write command to the second slot of the second stage of the bases so as to write output data.

In the sequencer system 20 represented as the first comparative example, connections between the bases and the units can be changed by a user depending on the intended use. Therefore, it is required that the control unit U0$a$0 allocates addresses, each including a base number and a slot number, immediately after system startup.

Therefore, in the sequencer system 20, such a way is employed that a signal for setting an address for each of the extension bases B1$a$ and B2$a$ is short-circuited by using a jumper line J and the signal is read by a logic circuit GA.

As a result, the logic circuit GA reads that the access from the composite signal line BUSa is directed to a unit of its own base. The logic circuit GA designates the unit by using such a way of outputting a select signal CS to the unit and then a controlled unit having received the select signal responds.

Figure 5:
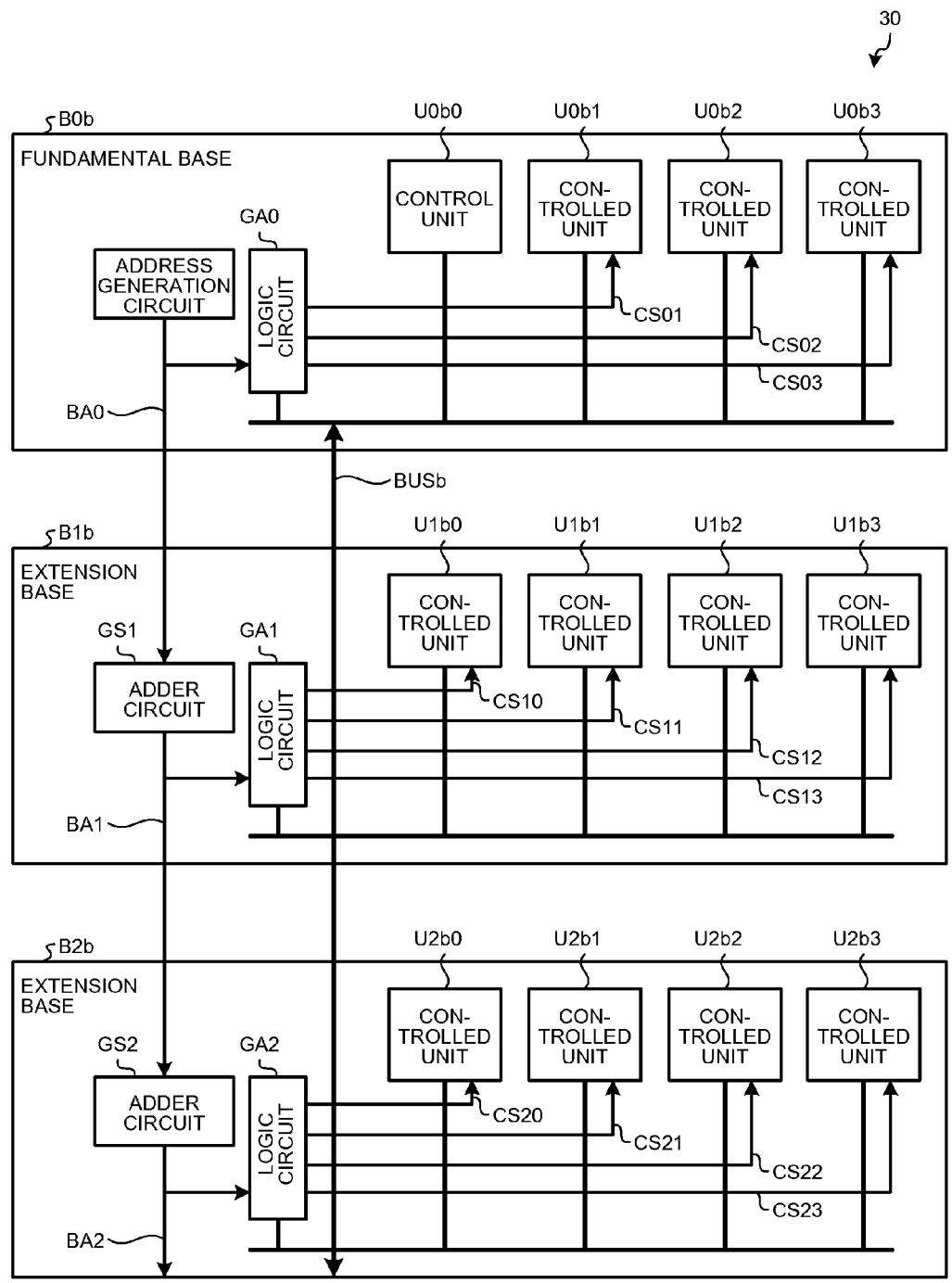
FIG. 5 is a block diagram illustrating a schematic configuration of a sequencer system represented as a second comparative example.

FIG. 5 is a block diagram illustrating a schematic configuration of a sequencer system represented as a second comparative example. In the second comparative example, a sequencer system 30 in which address setting is fixed is now described. Adder circuits GS are provided in the sequencer system 30. A base address for a fundamental base B0$b$ is generated by an address generation circuit provided in the fundamental base B0$b$. The base address for the fundamental base B0$b$ is electronically transferred to the extension bases B1$b$ and B2$b$ as an address designation signal BA. In each of the extension bases B1$b$ and B2$b$, the adder circuit GS increments the base address by one, and thus base addresses are generated for extension bases B1$b$ and B2$b$, respectively.

The generated base address is electronically transferred also to the logic circuit GA as the address designation signal BA. The logic circuit GA determines whether the access from the composite signal line BUSb is an access directed to its own base. The logic circuit GA designates a unit by using such a way of outputting the select signal CS to the unit and then a controlled unit having received the select signal responds.

Figure 6:
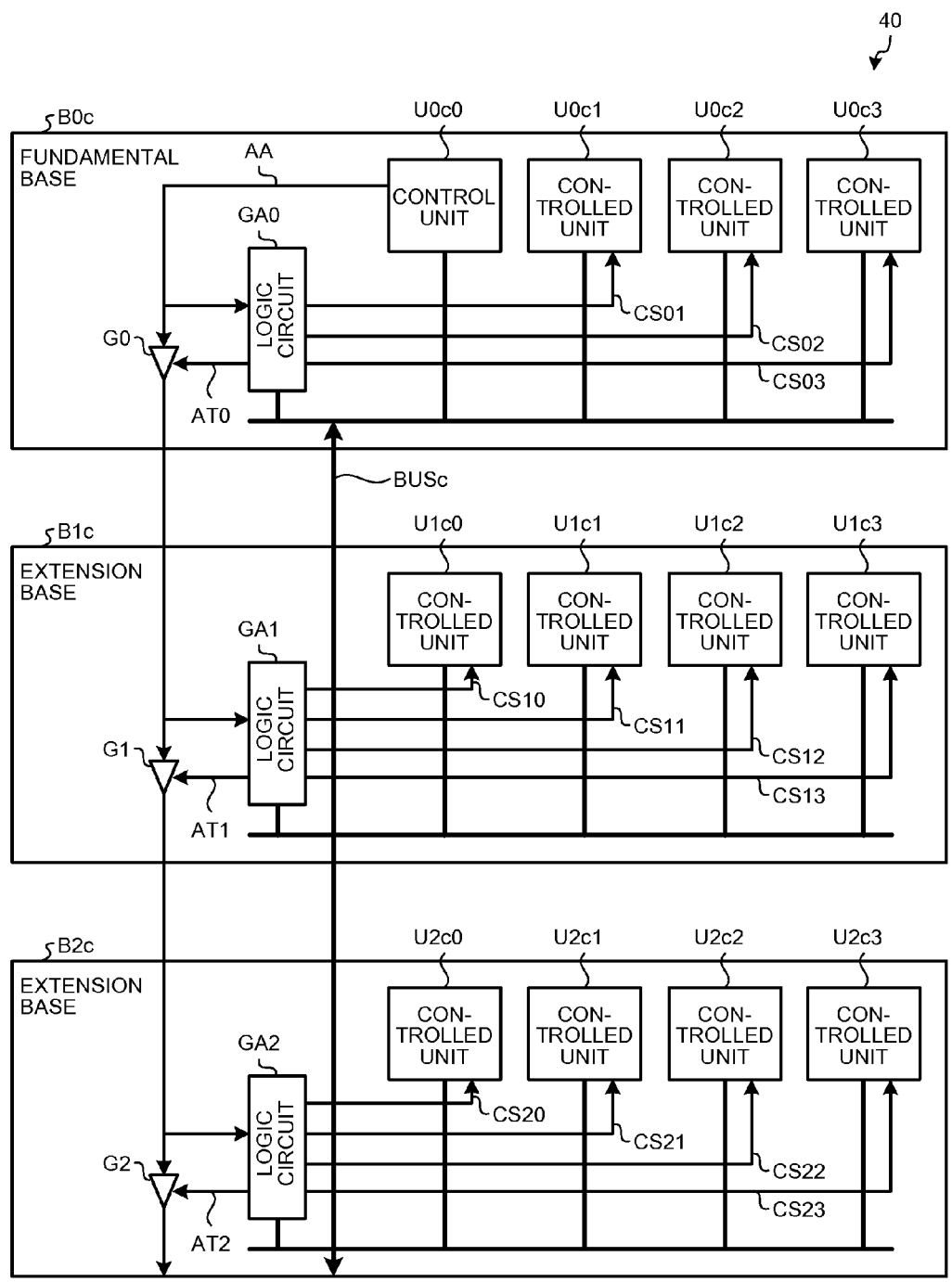
FIG. 6 is a block diagram illustrating a schematic configuration of a sequencer system represented as a third comparative example.

FIG. 6 is a block diagram illustrating a schematic configuration of a sequencer system represented as a third comparative example. In the third comparative example, a sequencer system 40 in which address setting is automated is now described. In the sequencer system 40, a control unit U0$c$ 0 transmits an address via a composite signal line BUSc and outputs an address fixing signal AA.

In a state that addresses are unset, the logic circuit GA receives the address fixing signal AA, self-configures the contents of the composite signal line BUSc, and transmits a response to the control unit U0$c$0 by using the composite signal line BUSc.

After the address setting is completed, the logic circuit GA outputs an address-fixing transfer signal AT to a gate G. The gate G having received the address-fixing transfer signal AT enters a state that the address fixing signal AA can be electronically transferred to an extension base connected to the subsequent stage. By repeating this operation also for the subsequent stage of the extension base, address setting for these bases is automated.

In the sequencer system 20 represented as the first comparative example, such an address setting method is employed that an address setting signal is short-circuited by the jumper line, thus increasing the workload of a user at the time of starting up the system or changing the system configuration. Further, from the viewpoint of focusing on system scalability in recent years, it has been desired to realize labor-saving of these tasks. In addition, because incomplete address setting and incorrect address setting are likely to occur due to a heavy workload at the time of system startup or system configuration change, automation of the work is desired.

In the sequencer system 30 represented as the second comparative example, an addressing signal is additionally required. Further, the address is sequentially incremented by one in an extension base, and thus the address is allocated sequentially from an upper stage. Therefore, an arbitrary address cannot be allocated to a specific stage. In addition, if a base is added to an intermediate stage, all addresses for the subsequent stages are changed, and thus a user also needs to change the addresses used in a program.

In the sequencer system 40 represented as the third comparative example, an address fixing signal is additionally required. After address setting is completed, the address fixing signal is electronically transferred to an extension base connected to a subsequent stage, so it is required to set the addresses sequentially from an upper stage. Further, after all the addresses have been set, the address fixing signal is electronically transferred to the base of the final stage. In this case, each of the extension bases is in a state of ignoring the address fixing signal, it is required to cancel all the addresses and set addresses again from the upper stage, in order to change the address for an arbitrary stage. Therefore, during resetting the addresses, the control unit cannot access all of other controlled units, and thus it is required to stop control of the sequencer system.

On the other hand, in the sequencer system 10 according to the first embodiment, the bases are connected one-to-one by one bus, and thus communication between these bases is independent of other bases. Simultaneous transmission to all of the bases is not performed even in a state that the base addresses are unset.

Therefore, in communication over a plurality of bases, a command is electronically transferred between these bases in a relay form, and information to be added to this command can be relayed and changed according to a certain rule.

In addition to such a configuration, a command, to which information regarding the number of HOPs is added, is transmitted. By using a rule that the number of HOPs is subtracted by one, each of the bases relays and electronically transfers the command. With a result that the number of HOPs becomes 0, each of the bases recognizes that the command is directed to its own base. And thus, when the number of stages of the bases is added to a command as the number of HOPs even in a state that the base addresses are unset, it is possible to access an arbitrary base regardless of the connection order of the bases. Therefore, such an addressing signal and an address fixing signal are not additionally needed. That is, if control unit designates the number of HOPs to the number of stage of an extension base to which a command is intended to be sent and the control unit generates the command for the intended extension base, affection on other bases different from the intended extension base would be avoided.

The control unit may transmit a packet to a base connected to an arbitrary stage and determine the presence of connection of extension bases based on the presence of a response from this base within a set time. Further, designation of the number of HOPs, a rule of subtracting the number of HOPs, and a rule that each of the bases transmits a response packet when the number of HOPs becomes 0 are employed. Therefore, connection of the extension bases can be detected according to an arbitrary order, regardless of the connection order of the bases.

Furthermore, in addition to information regarding the number of HOPs, a command for setting to a unique address is added to a packet. The packet is transmitted from a control unit that is connected to a fundamental base to a base connected to an arbitrary stage. Therefore, upon reception of the packet with the number of HOPs being 0, a base determines that the packet is directed to its own base and self-configures its own address to the specified unique address.

In this way, by using the number of HOPs, address setting can be automated and the workload of a user can be reduced. Further, while maintaining the state that addresses are set for other bases, an address for a base connected to an arbitrary stage can be set. Owing to such a configuration, only an address for a targeted base can be set without stopping the control of controlled units installed in other bases different from the targeted base.

INDUSTRIAL APPLICABILITY

As described above, the sequencer system according to the present invention is useful as a sequencer system including a fundamental base and extension bases.

REFERENCE SIGNS LIST

10, 20, 30, 40 sequencer system, B0, B0*a*, B0*b*, B0*c* fundamental base, B1 to 2, B1*a* to 2*a*, B1*b* to 2*b*, B1*c* to 2*c* extension base, U00, U0*a* 0, U0*b* 0, U0*c* 0 control unit, U01 to 03, U10 to 13, U20 to 23, U0*a* 1 to 0*a* 3, U1*a* 0 to 1*a* 3, U2*a* 0 to 2*a* 3, U0*b* 1 to 0*b* 3, U1*b* 0 to 1*b* 3, U2*c* 0 to 2*c* 3, U0*c* 1 to 0*c* 3, U1*c* 0 to 1*c* 3, U2*c* 0 to 2*c* 3 controlled unit, G gate, GA logic circuit, GS adder circuit, J jumper line, CS select signal, BUS composite signal line, BA address designation signal, AT address-fixing transfer signal, HUB relay unit.

The invention claimed is:

1. A sequencer system comprising a plurality of bases, wherein:

the plurality of bases includes a fundamental base and a plurality of stages of extension bases, the fundamental base being installed with a control unit, the fundamental base and the plurality of stages of extension bases are serially connected by a bus using composite signal lines, the fundamental base being one end of the serial connection, communication with one of the bases different from another of the bases adjacent to the one base is enabled by electronic transfer between the bases in a relay form, the control unit is configured to transmit a first HOP designation packet toward the bases, a number of HOPs being designated for the first HOP designation packet, upon reception of the first HOP designation packet with the number of HOPs being other than 0, each of the bases subtracts the number of HOPs by one, and transfers the first HOP designation packet to the base connected to a subsequent stage, and, upon reception of the first HOP designation packet with the number of HOPs being 0, each of the bases determines that the first HOP designation packet is a packet directed to the base itself, the control unit is further configured to, in response to receiving a response packet from one of the bases within a predetermined time period after transmitting the first HOP designation packet, transmit a second HOP designation packet comprising an address setting command to the base, upon reception of the first HOP designation packet with the number of HOPs being 0, each of the bases transmits the response packet to the control unit, the control unit is further configured to add the address setting command to the second HOP designation packet, the address setting command being a command for setting a unique address for the base, and upon reception of the second HOP designation packet with the number of HOPS being 0, each of the bases self-configures to an address designated in the address setting command added to the second HOP designation packet.

2. An address setting method for a plurality of stages of extension bases in a multistage sequencer system, the multistage sequencer system including a fundamental base and the extension bases, the fundamental base being installed with a control unit, each of the extension bases being installed with a controlled unit, the fundamental base and the extension bases being serially connected, and the fundamental base being one end of the serial connection, wherein the address setting method comprises:

generating, by the control unit, a first HOP designation packet, a number of HOPs being designated for the first HOP designation packet;

in response to receiving a response packet from one of the bases within a predetermined time period after transmitting the first HOP designation packet, adding, by the control unit, an address setting command to a second HOP designation packet;

transmitting, by the control unit, to the fundamental base and the extension bases, the second HOP designation packet to which the address setting command has been added;

subtracting, by the fundamental base and the extension bases, upon reception of the second HOP designation packet with the number of HOPs being other than 0, the number of HOPs by one, and transferring the second HOP designation packet to the extension base connected to a subsequent stage;

self-configuring, by the extension bases, upon reception of the second HOP designation packet with the number of HOPs being 0, to an address designated in the address setting command added to the second HOP designation packet;

upon receiving the first HOP designation packet with the number of HOPs being 0, transmitting, by each of the bases, the response packet to the control unit; and adding the address setting command to the second HOP designation packet, the address setting command being a command for setting a unique address for the base, wherein the self-configuring comprises, upon receiving the second HOP designation packet with the number of HOPs being 0, each of the extension bases self-configures to the address designated in the address setting command added to the second HOP designation packet.

* * * * *